(12) United States Patent
Hosseinian et al.

(10) Patent No.: US 12,483,985 B2
(45) Date of Patent: Nov. 25, 2025

(54) METHODS AND APPARATUS FOR LOW POWER WAKE-UP SIGNAL WAVEFORM DESIGN AND MULTIPLEXING WITH NEW RADIO WAVEFORM

(71) Applicant: Samsung Electronics Co., Ltd., Gyeonggi-do (KR)

(72) Inventors: Seyed Mohsen Hosseinian, San Diego, CA (US); Philippe Sartori, Naperville, IL (US)

(73) Assignee: Samsung Electronics Co., Ltd., Seoul (KR)

( * ) Notice: Subject to any disclaimer, the term of this patent is extended or adjusted under 35 U.S.C. 154(b) by 305 days.

(21) Appl. No.: 18/120,205

(22) Filed: Mar. 10, 2023

(65) Prior Publication Data

US 2023/0337135 A1 Oct. 19, 2023

Related U.S. Application Data

(60) Provisional application No. 63/332,217, filed on Apr. 18, 2022.

(51) Int. Cl.
*H04W 52/00* (2009.01)
*H04L 27/02* (2006.01)
*H04L 27/26* (2006.01)
*H04W 52/02* (2009.01)

(52) U.S. Cl.
CPC ......... *H04W 52/0229* (2013.01); *H04L 27/02* (2013.01); *H04L 27/2605* (2013.01)

(58) Field of Classification Search
None
See application file for complete search history.

(56) References Cited

U.S. PATENT DOCUMENTS

| | | | |
|---|---|---|---|
| 10,756,864 B2 | 8/2020 | Seo et al. | |
| 11,284,372 B2* | 3/2022 | Cox | H04W 52/0235 |
| 2021/0014792 A1* | 1/2021 | Awater | H04L 27/2614 |
| 2022/0124620 A1 | 4/2022 | Liu et al. | |
| 2022/0124621 A1 | 4/2022 | Liu et al. | |
| 2022/0286964 A1 | 9/2022 | Peng et al. | |
| 2022/0295398 A1 | 9/2022 | Hwang et al. | |
| 2024/0121634 A1* | 4/2024 | Zhou | H04L 5/001 |

FOREIGN PATENT DOCUMENTS

WO WO-2021028436 A1 * 2/2021 .......... H04W 72/542

OTHER PUBLICATIONS

Vivo, "New SID: Study on low-power Wake-up Signal and Receiver for NR", 3GPP TSG RAN meeting #94e RP-213645 Electronic Meeting, Dec. 6-17, 2021, pp. 4.

(Continued)

*Primary Examiner* — Gerald A Smarth
(74) *Attorney, Agent, or Firm* — The Farrell Law Firm, P.C.

(57) ABSTRACT

Disclosed is a method of a gNB, including encoding a low power wake up signal (LP-WUS) payload using a line coding scheme, mapping a line coding output of the line coding scheme to baseband symbols using a keying modulation, mapping symbols of the keying modulation to baseband LP-WUS blocks, and transmitting the baseband LP-WUS blocks to at least one UE.

20 Claims, 17 Drawing Sheets

(56) References Cited

OTHER PUBLICATIONS

3GPP TS 38.211 V17.0.0 (Dec. 2021), 3rd Generation Partnership Project; Technical Specification Group Radio Access Network; NR; Physical channels and modulation (Release 17), pp. 134.
Salazar, Camilo et al., "A -97dBm-Sensitivity Interferer-Resilient 2.4GHz Wake-Up Receiver Using Dual-IF Multi-N-Path Architecture in 65nm CMOS" 2015 IEEE International Solid-State Circuits Conference, pp. 3.
3GPP TR 38.875 V17.0.0 (Mar. 2021), 3rd Generation Partnership Project; Technical Specification Group Radio Access Network; Study on support of reduced capability NR devices (Release 17), pp. 135.
3GPP TS 23.003 V17.5.0 (Mar. 2022), 3rd Generation Partnership Project; Technical Specification Group Core Network and Terminals; Numbering, addressing and identification; (Release 17), pp. 146.

\* cited by examiner

METHODS AND APPARATUS FOR LOW POWER WAKE-UP SIGNAL WAVEFORM DESIGN AND MULTIPLEXING WITH NEW RADIO WAVEFORM

CROSS-REFERENCE TO RELATED APPLICATIONS

This application claims the priority benefit under 35 U.S.C. § 119(e) of U.S. Provisional Application No. 63/332,217, filed on Apr. 18, 2022, the disclosure of which is incorporated by reference in its entirety as if fully set forth herein.

TECHNICAL FIELD

The disclosure generally relates to wireless communication systems. More particularly, the subject matter disclosed herein relates to improvements to a low power wake-up receiver (LP-WUS) in such wireless communication systems.

SUMMARY

The fifth generation (5G) systems of cellular networks have been designed and developed to improve both mobile telephony and vertical use instances. User equipment (UE) energy efficiency is critical to 5G along with latency, reliability and availability. Currently, 5G devices may have to be recharged per week or per day depending on individual usage time. 5G devices generally consume tens of milliwatts (mW) in a radio resource control (RRC) idle/inactive state and hundreds of mWs in an RRC connected state, which creates great strains on batteries needed to power these devices. Designs to prolong battery life have been proposed for improving energy efficiency and the user experience.

Low-power wakeup receivers (LP-WUR) have been considered by the third generation partnership project (3GPP) to mitigate this problem. Proposals include LP-WUR architectures and wake-up signal (WUS) designs to support WURs.

The LP-WUR is for WUS detection and is separate from the regular receiver, such as a synchronization signal block (SSB) receiver or a data/control receiver. The LP-WUR may improve the power saving gain at least for an idle/inactive state. The WUS used by LP-WUR may be referred to as the LP-WUS.

One objective of the LP-WUR is to add a companion WUR receiver to the main radio of a UE and to use this main radio to monitor a wireless channel for a wake-up signal/packet. The main radio will only be turned on when the WUR receives the wake-up signal/packet. Since the wake-up signal/packet uses a far less complex modulation scheme compared to the main radio, the WUR receiver may be designed to have a much lower power consumption than the main radio receiver. With the addition of a low-power WUR, the main radio fundamentally becomes event driven, thereby consuming power only when necessary.

FIG. 1 illustrates an LP WUR 100, according to the prior art. As shown in diagram 101, when there is no data to be received by the main radio 103, the main radio 103 is turned off and only the LP-WUR 104 is turned on to monitor for a wake-up packet. In diagram 102, as soon as a wake-up packet is detected by the LP-WUR, i.e., when there is data to receive, the main radio wakes up and receives the relevant data that the main radio is intended to receive.

Different LP-WUR architectures and designs have been proposed to support institute of electrical and electronics engineers (IEEE) 802.11ba requirements. Targeting wireless local area network (WLAN) and specifically wireless fidelity (WiFi), 802.11ba has more relaxed requirements for receiver sensitivity and link budget compared to the 3GPP. A 3GPP UE receiver demands more stringent requirement for receiver sensitivity. Recently, LP-WUR architectures that provide receiver sensitivity as low as −97 decibel milliwatts (dBm) have been proposed. For instance, a 2.4 gigahertz (GHz) WUR has been presented with −97 dBm sensitivity for 10 kilobits per second (kbps) and $10^{-3}$ bit error rate (BER) and is operated from a single 0.5 volt (V) supply. Most of the proposed LP-WUR architectures operate based on on-off keying (OOK) modulation for energy efficiency properties.

FIG. 2 illustrates the construction of a WUS packet 200, according to the prior art. In FIG. 2, a narrowband OFDM waveform is generated by populating the contiguous 13 subcarriers with null center subcarrier to occupy a 4 MHz band. (Narrowband portion). The WUS packet 200 comprises a non-WUR portion 201 and the WUR portion 202, as shown. The non-WUR portion 201 is 20 MHz wide and 28 microseconds (s) in duration and comprises a legacy preamble, i.e., legacy short training field (LSTF), legacy long training field (LLTF), legacy signal (LSIG) and binary phase shift keying (BPSK)-mark. The legacy preamble enables coexistence with non-WUR compatible Wi-Fi devices, i.e., a legacy non-HT preamble.

FIG. 3 illustrates a sample architecture 300 for an LP-WUR that operates based on OOK modulation, according to the prior art.

As seen in FIG. 3, the LP-WUR generally includes passive components with a minimal number of ultra-low power active components, such as the ultra-low power microcontroller 301, which contributes to the extremely low power consumption of near zero. As such, these receivers are also referred to as "almost zero power receivers." Power consumption in the range of a few nanowatts (nWs) to a few mWs has been reported for such receivers.

FIG. 4 illustrates LP-WUR architectures 400, according to the prior art. Specifically, FIG. 4 illustrates a simple architecture 401 based on RF envelope detection, a heterodyne architecture 402 based on IF envelope detection, and a zero-IF architecture 403 based on baseband detection These architectures are intended to operate in OOK (on-off keying) modulation. LP-WUR architectures based on FSK modulation generally consist of two parallel LP-WURs for OOK. Herein, FSK modulation and OOK modulation may be referred to as types of keying modulation.

The conventional LP-WUR and LP-WUS have been specified particularly for WiFi radio. In new radio (NR) configurations, energy efficiency is extremely critical for UEs without a continuous energy source, such as UEs using small rechargeable or single coin cell batteries. Among vertical use cases, sensors and actuators are deployed extensively for monitoring, measuring, and charging devices. Generally, batteries of such vertical use cases are not rechargeable and are expected to last at least a few years.

Wearable devices include smart watches, rings, eHealth related devices, and medical monitoring devices. With a typical battery capacity, it may be challenging to sustain up to one week of a charge in normal use of such wearable devices.

NR has inherited some power-saving schemes, such as a discontinuous reception (DRX) mechanism from the fourth generation long term evolution (4G LTE). DRX capabilities have been enhanced and a newer version of discontinuous reception was designed as extended DRX or eDRX. In eDRX, the power consumption depends on the configured length of wake-up periods, such as a paging cycle. To meet the battery life requirements, an eDRX cycle with a large value may be used, resulting in high latency which is unsuitable for such services requiring long battery life and low latency. Thus, the intention in NR Rel-18 is to study an ultra-low power mechanism that may support a lower latency than eDRX latency.

An issue with the above approach is that UEs periodically wake up once per DRX cycle, which exhausts power consumption in periods with no signaling or data traffic.

To overcome these issues, systems and methods are described herein for dynamic state changing of UEs in response to a trigger, thereby significantly reducing power consumption and improve device health and efficiency. Further embodiments discussed include using a separate receiver with ultra-low power consumption, which monitors a low power "wake-up" signal to trigger the main radio. The main radio operates for data transmission and reception, which may be turned off or set to sleep unless the main radio is turned on.

The power consumption for monitoring low-power wake-up signal depends on the low power wake-up signal design and the hardware module of the low-power wake-up receiver used for signal detecting and processing.

The above approaches improve on previous methods by providing a simplified signal design for a low power wake-up signal that is compatible with the NR waveform and achieves fitment in the NR radio-frame structure, while significantly improving the power consumption patterns and rates of NR devices.

In an embodiment, a method of a gNB includes encoding LP-WUS payload using a line coding scheme, mapping a line coding output of the line coding scheme to baseband symbols using a keying modulation, mapping symbols of the keying modulation to baseband LP-WUS blocks, and transmitting the baseband LP-WUS blocks to at least one UE.

In an embodiment, an apparatus includes at least one processor, and at least one memory operatively connected with the at least one processor, the at least one memory storing instructions, which when executed, instruct the at least one processor to perform a method by encoding an LP-WUS payload using a line coding scheme, mapping a line coding output of the line coding scheme to baseband symbols using a keying modulation, mapping symbols of the keying modulation to baseband LP-WUS blocks, and transmitting the baseband LP-WUS blocks to at least one UE.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
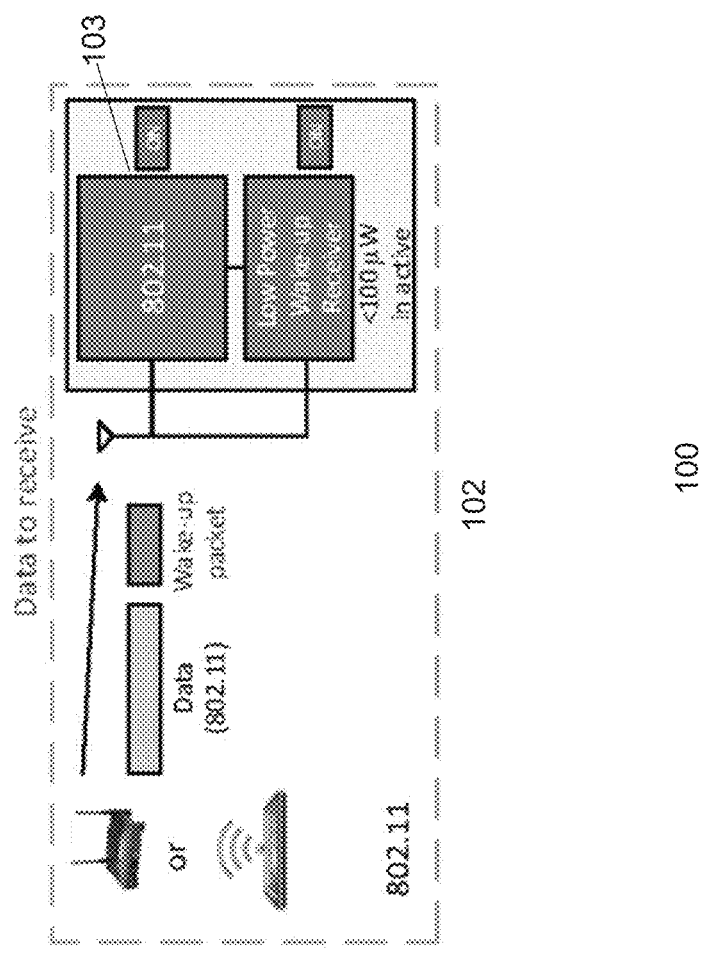
FIG. 1 illustrates an LP WUR 100, according to the prior art.
Figure 1:
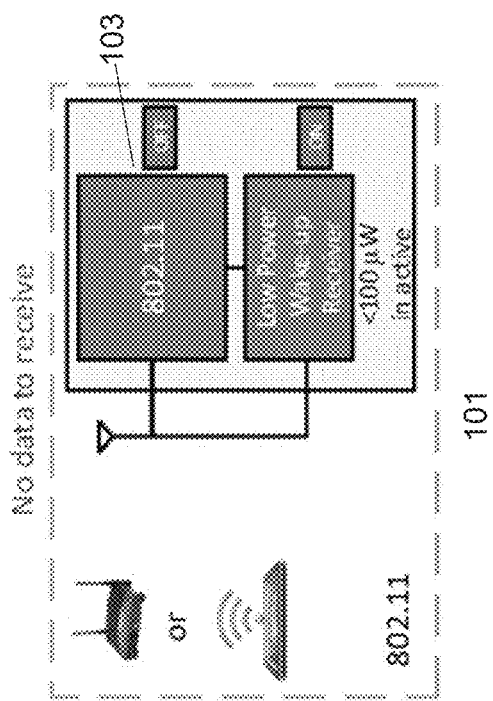
Figure 2:
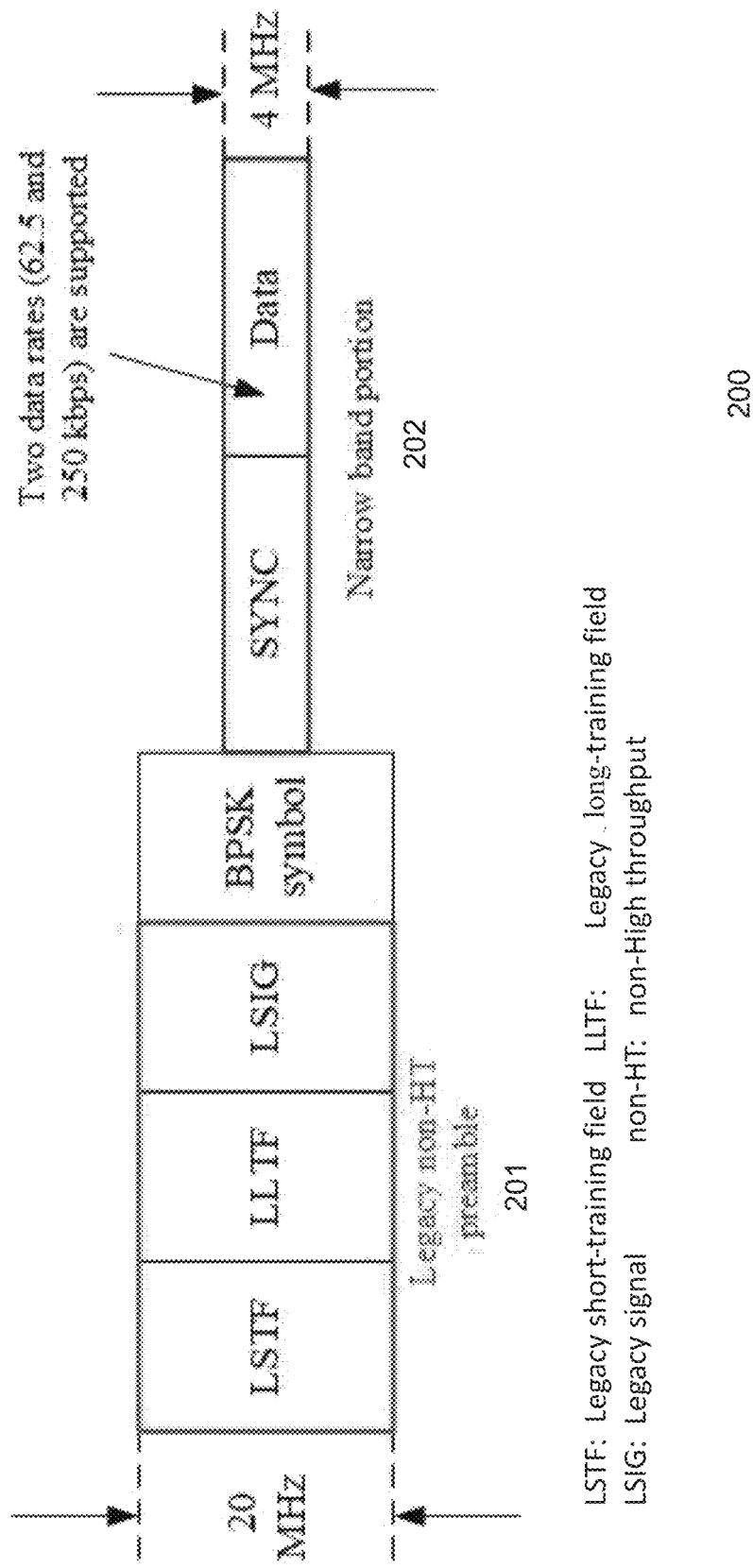
FIG. 2 illustrates the construction of a WUS packet 200, according to the prior art.

In the following detailed description, numerous specific details are set forth to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments.

Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

LP-WUS and NR Waveform Multiplexing

Figure 3:
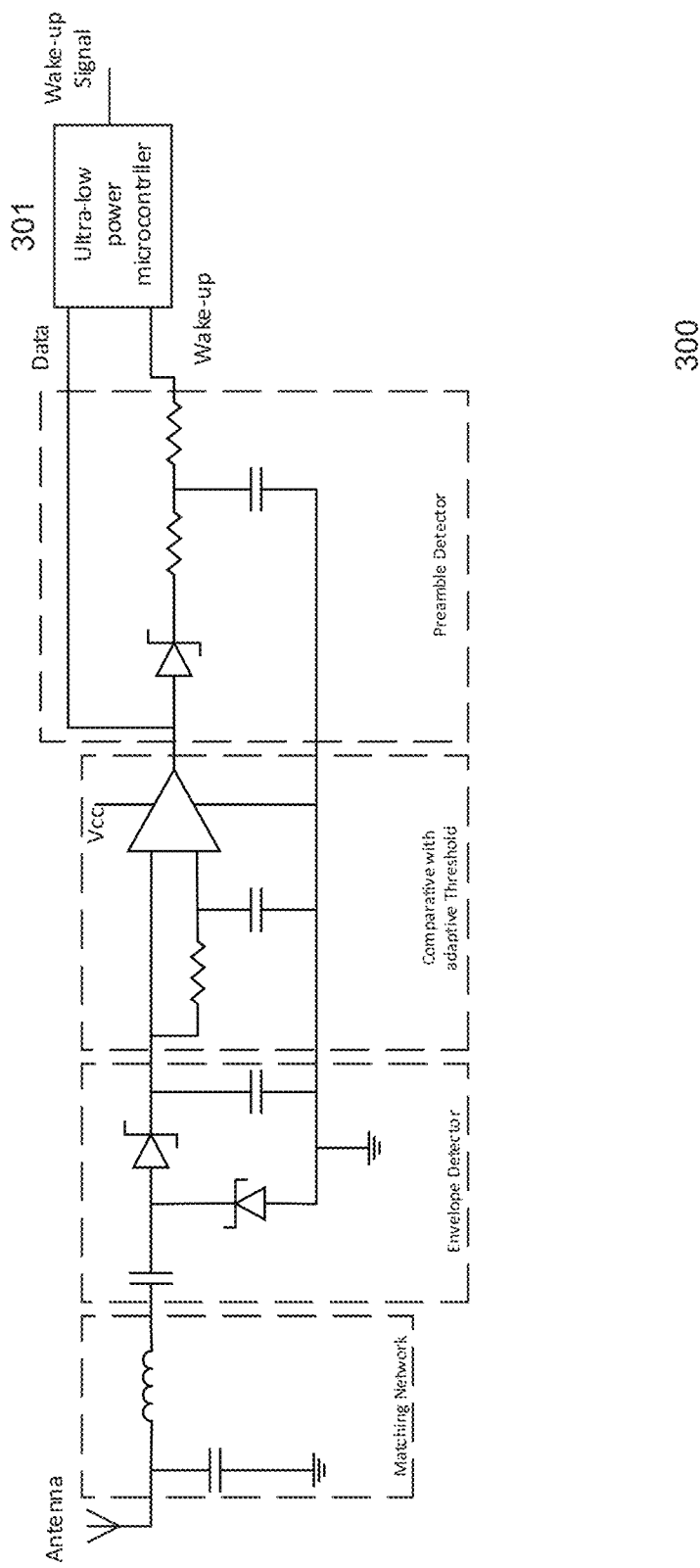
FIG. 3 illustrates a sample architecture 300 for an LP-WUR operating based on OOK modulation, according to the prior art.
Figure 5:
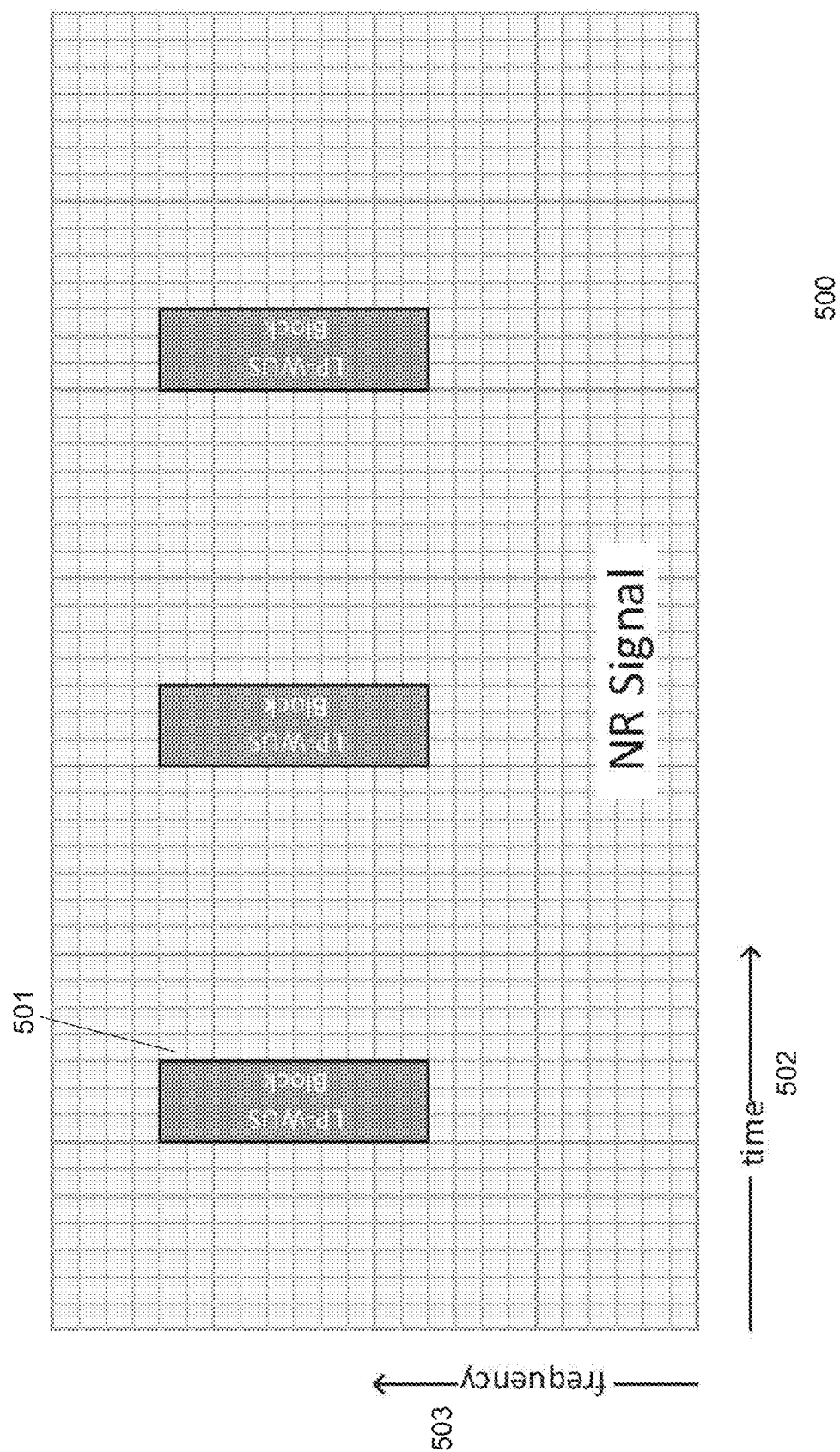
FIG. 5 illustrates a transmission 500 of LP-WUS blocks, according to an embodiment.

FIG. 5 illustrates a transmission 500 of LP-WUS blocks, according to an embodiment. In FIG. 3, the LP-WUS blocks 501 are sent periodically in the same frequency resources. LP-WUS may be multiplexed with a NR signal in time 502 and frequency 503 domains. Some subcarriers or alternatively resource blocks (RBs) of the NR signal may be left empty and reserved for LP-WUS. At least one LP-WUS, referred to herein as an LP-WUS block 501, may be sent on the empty subcarriers or empty RBs, as shown in FIG. 5. LP-WUS blocks may be sent periodically or aperiodically in time domain using the same or different resources in frequency domain. For example, FIG. 5 illustrates the LP-WUS blocks 501 being sent periodically in the time domain 502 and using the same resources in the frequency domain 503.

Figure 4:
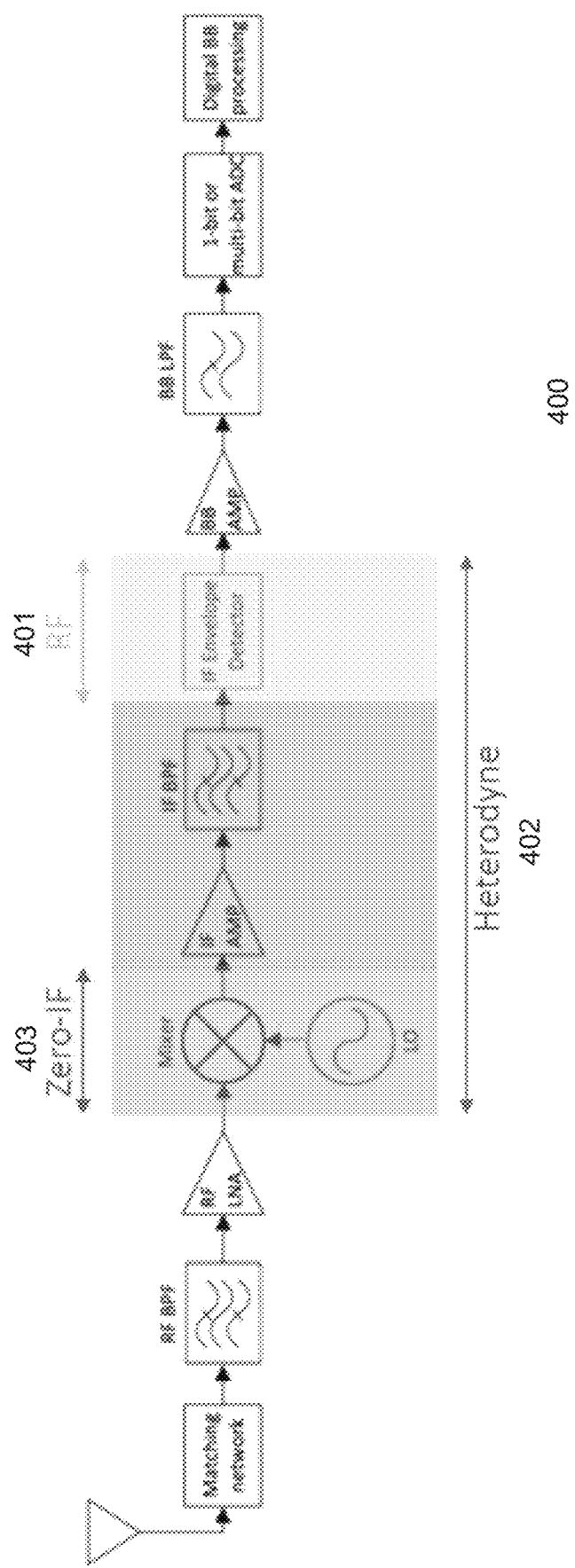
FIG. 4 illustrates LP-WUR architectures 400, according to the prior art.
Figure 6:
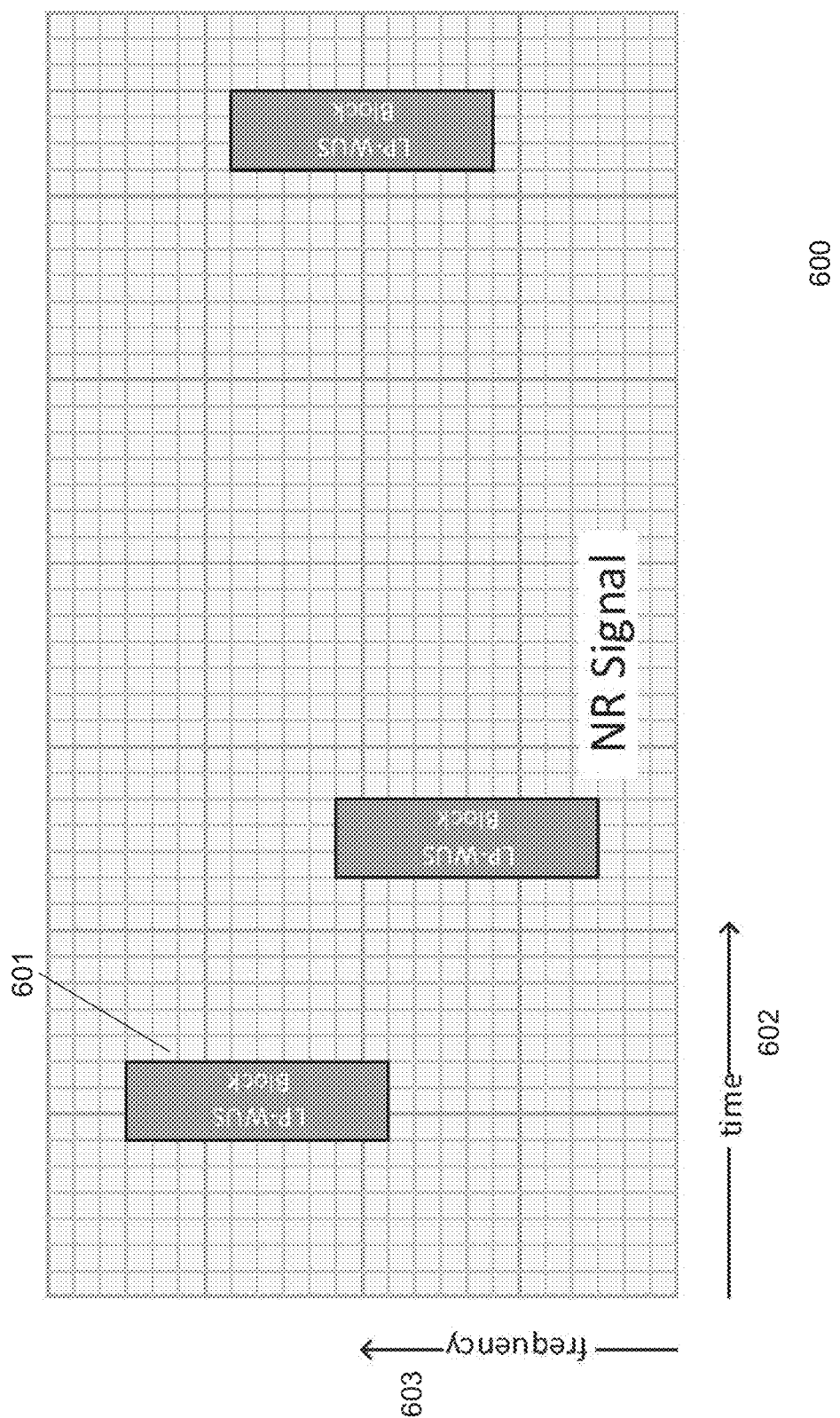
FIG. 6 illustrates an aperiodic transmission 600 of LP-WUS blocks, according to an embodiment.

FIG. 6 illustrates an aperiodic transmission 600 of LP-WUS blocks, according to an embodiment. In FIG. 6, the LP-WUS blocks 601 are sent aperiodically in different frequency resources. That is, the LP-WUS blocks 601 in FIG. 4 are sent aperiodically in the time domain 602 and use different resources in the frequency domain 603.

The frequency domain position of an LP-WUS block within the channel bandwidth or a bandwidth part (BWP) may be specified using an RB offset and a subcarrier offset. For example, with respect to the frequency domain position, $N_{CRB}^{WUSB}$ may define an RB offset between common RB 0 and the RB that overlaps with the start of the LP-WUS block, $k_{WUSB}$ may define a subcarrier offset from subcarrier 0 of the common RB identified as above to subcarrier 0 of the LP-WUS block, and $N_{SC}^{WUSB}$ may define the number of subcarriers that the LP-WUS block occupied in the frequency domain, or alternatively, $N_{BR}^{WUSB}$ may define the number of RBs that the LP-WUS block occupied in the frequency domain.

The values of $N_{CRB}^{WUSH}$, $k_{WUsB}$, and $N_{SC}^{WUSB}$ or $N_{RB}^{WUSB}$ may be broadcast within a master information block (MIB) or a system information block (SIB), such as when a UE is in an RRC_IDLE state. Alternatively, if a UE is in an RRC_INACTIVE state or an RRC_CONNECTED state, the UE may be configured/reconfigured using RRC (re)configuration with the values of $N_{CRB}^{WUSB}$, $k_{WUSB}$, and $N_{NC}^{WUSB}$ or $N_{RN}^{WUSB}$. A UE may also be configured with these values using one or more medium access control (MAC) control elements (CEs) or downlink control information (DCI).

In another example, the frequency-domain position of the LP-WUS block within the channel bandwidth or the BWP may be specified using a pair of absolute frequencies. Dedicated signaling may be used to provide absolute frequencies within the FrequencyInfoDL parameter structure. The absoluteFrequencyWUS-Start information element may specify the first position and the absoluteFrequencyWUS-Stop information element may specify the last position of the LP-WUS block, using an NR absolute radio frequency channel number (NR-ARFCN) value, respectively.

A UE does not have to be configured with a time domain position of the LP-WUS Block. The concept of the low-power wake-up signaling is based on the wake-up radio being always on and continuously monitoring the receive signal. Therefore, a UE may be unaware of the location of the time domain position of the LP-WUS block. However, accurate timing with paging occasions when a UE is in the RRC_IDLE state may involve specifying time domain positions for LP-WUS blocks, as will be discussed below.

Ues not Supporting LP-WUS

A UE operating on a carrier in which LP-WUS blocks may be present may not support LP-WUS, or the UE may support LP-WUS but may not be configured with all LP-WUS block occasions. In such a case, the UE must know where these signals are located to avoid the REs occupied by the LP-WUS blocks and, if appropriate, to wrap around those REs. The following three solutions for this issue are disclosed.

An entire slot (or full PRBs in a slot) is reserved for LP-WUS transmission. In such a case, a gNB avoids scheduling transmissions on the resources where LP-WUS Blocks may be present. In the frequency domain, the REs that LP-WUS Blocks occupy are indicated to UE using the mechanism specified above. In the time domain, the slots where the LP-WUS Blocks are located are indicated in the SIB where the LP-WUS are configured. Alternatively, an offset e (in terms of number of slots) from the paging opportunities may be configured. A UE receiving the offset knows that the subframe e slots before the paging opportunities are reserved for LP-WUS transmissions.

LP-WUS blocks are transmitted on REs where CSI-RS is transmitted. In this case, for the receiving UE, a ZP-CSI-RS is configured, and coincides with the REs occupied the LP-WUS blocks. Thus, when the LP-WUS block is transmitted, the UE does not decode these REs because it is on a ZP-CSI-RS. This approach affords the ability to multiplex LP-WUS blocks with a physical downlink shared channel (PDSCH), even for legacy UEs. However, this approach may be too restrictive such as when the LP-WUS involves some large guard frequency/time, depending on the parameters of the LP-WUS.

LP-WUS are transmitted on REs corresponding to a rate matching pattern. Reserved resources are used to indicate a UE for which specific REs are unavailable for PDSCH reception. The location of the LP-WUS blocks REs could be specified by using RateMatchPattern parameter structure. This parameter structure may be included within the ServingCEllConfigCommon or ServingCEllConfig or within PDSCH-Config. This way a UE that does not support LP-WUS could avoid decoding LP_WUS blocks. This solution may be also applied to legacy UEs. For instance, if LP-WUS blocks are located within the first three symbols of the slot (e.g., where the PDCCH would be transmitted), an already defined RateMatchPattern could be used. For Rel-18 and beyond, a new rate matching pattern, e.g., RateMatchPatternLP, may be defined. The RateMatchPatternLP parameter structure for Rel-18 and beyond, may be included within the ServingCEllConfigCommon or ServingCEllConfig when defining reserved resources within a cell. Alternatively, the parameter structure may be included within PDSCH-Config when defining reserved resources within a BWP.

LP-WUS During RRC_IDLE or RRC_INACTIVE

As explained above, an LP-WUS may be sent periodically or aperiodically at any time, since the LP-WUR receiver may be always on and is always monitoring the receive LP-WUS. To conserve power, however, an LP-WUR receiver may wake up periodically to monitor the LP-WUS only in specific occasions, and otherwise remain in a sleep mode.

Specifically, in RRC_IDLE or RRC_INACTIVE states, a UE monitors paging occasions according to NR specifications in specific paging occasions. A paging occasion (PO) is defined by the system frame number (SFN), which satisfies Equation (1) as follows:

$$(SFN+PF_{offset}) \bmod T = (T/N) \times (UE_{ID} \bmod N) \quad (1)$$

In Equation (1), SFN identifies the PO, $PF_{offset}$ is a time domain offset in terms of radio frames, T is the DRX cycle duration in radio frames, N is the number of POs during each DRX cycle, and $UE_{ID}$ is UE identification defined as "5G-S-TMSI mode 1024". The 5G S-temporary mobile subscription identifier (5G-S-TMSI) is defined in the 3GPP TS 23.003 specification. In NR, a UE is configured with information to identify the PO.

In this embodiment, the network may send an LP-WUS targeting a UE directly prior to the PO that is assigned to the same UE. In this manner, the UE turns on its LP-WUR only when is the UE is monitoring the PO.

LP-WUS and Beamforming

Figure 7:
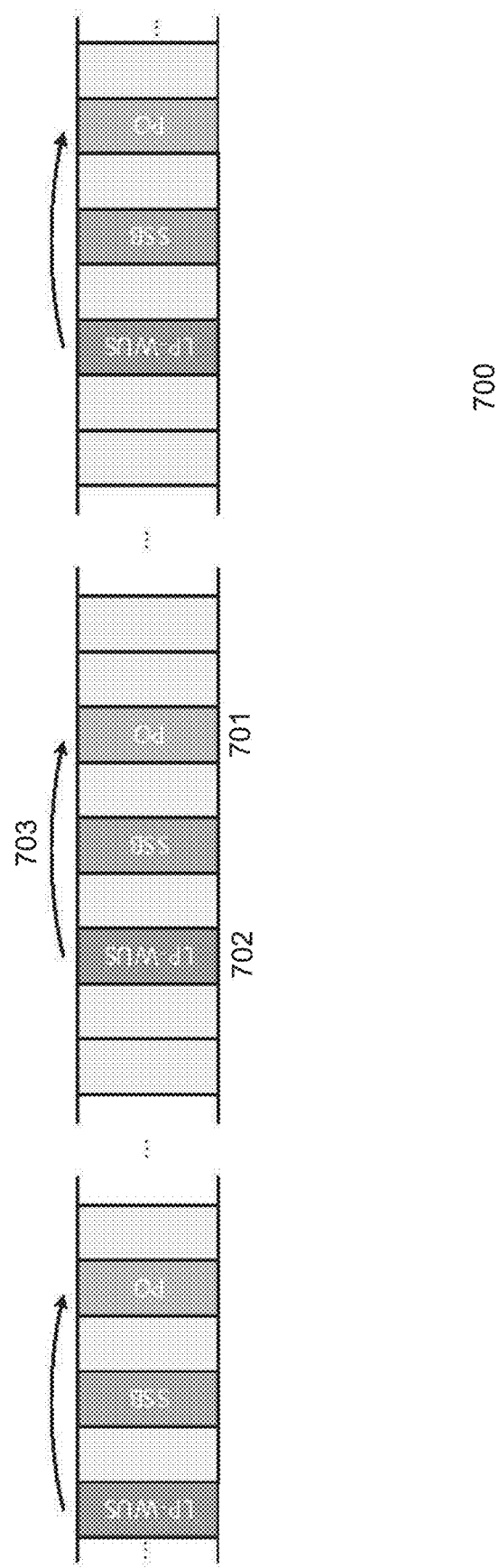
FIG. 7 illustrates a mapping 700 between LP-WUS occasions and POs (PO), according to an embodiment.

FIG. 7 illustrates a mapping 700 between LP-WUS occasions and POs, according to an embodiment. A time gap 703 is necessary between a PO 701 and the preceding LP-WUS 702 such that one or more SSBs 704 may sent in between the PO 701 and preceding LP-WUS 702. In this manner, the target UE that is being awakened by the LP-WUS will be able to synchronize to the network using SSB signals 704 and will be prepared to receive paging signals in the following PO 701.

Figure 8:
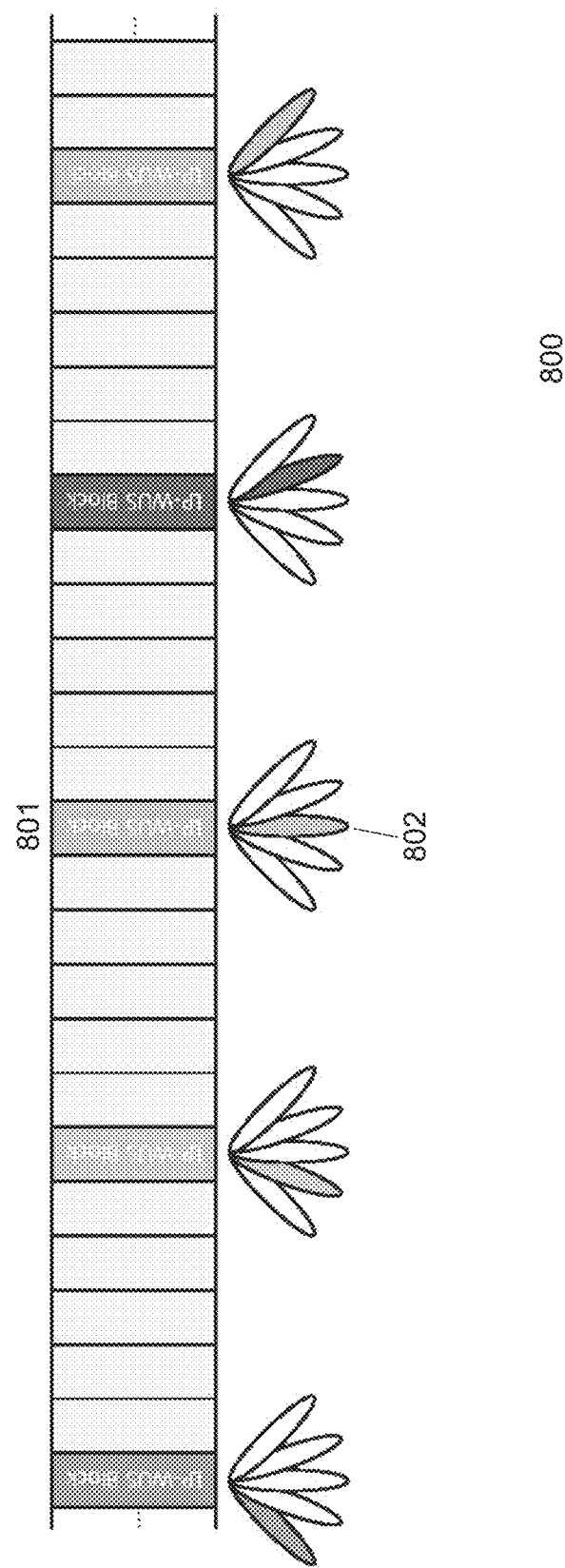
FIG. 8 illustrates a mapping 800 of the LP-WUS blocks to transmit beams, according to an embodiment.

FIG. 8 illustrates a mapping 800 of the LP-WUS blocks to transmit beams, according to an embodiment.

In FIG. 8, the LP-WUS may be beamformed using digital, analog, or hybrid beamforming and each LP-WUS block 801 may be mapped to a beam 802, as illustrated. The network may transmit the LP-WUS targeting a UE or a group of UEs that are associated with a specific beam on the same beam. The network may associate a UE or a group of UEs with a beam using the synchronization signal physical broadcast channel (SS/PBCH) block beam association or any other suitable beam association procedure. Beamforming for LP-WUS enables a higher signal quality to be provided to UEs by focusing the LP-WUS in a specific direction. This also provides an enhanced received LP-WUS quality resulting in fewer errors, without necessitating a power increase of the LP-WUS transmission.

LP-WUS Waveform Construction

For an NR cyclic prefix orthogonal frequency division multiplexing (CP-OFDM) waveform, the baseband time-continuous signal $s_l^{(p,\mu)}(t)$ on antenna port p and subcarrier spacing configuration y for OFDM symbol $l \in \{0, 1, \ldots, N_{slot}^{subframe,\mu} N_{symb}^{slot} -1\}$ (where $N_{slot}^{subframe,\mu}$ is the number of slots per subframe for subcarrier spacing configuration $\mu$, and $N_{symb}^{slot}$ is the number of symbols per slot) in a subframe is defined by Equations (2) and (3) as follows:

$$s_l^{(p,\mu)}(t) = \begin{cases} \bar{s}_l^{(p,\mu)}(t) & t_{start,l}^{\mu} \le t < t_{start,l}^{\mu} + T_{symb,l}^{\mu} \\ 0 & \text{otherwise} \end{cases} \quad (2)$$

$$\bar{s}_l^{(p,\mu)}(t) = \sum_{k=0}^{N_{grid,x}^{size,\mu} N_{sc}^{RB}-1} a_{k,l}^{(p,\mu)} e^{j2\pi\left(k+k_0^{\mu}-N_{grid,x}^{size,\mu} N_{sc}^{RB}/2\right)\Delta f\left(t-N_{CP,l}^{\mu} T_c - t_{start,l}^{\mu}\right)} \quad (3)$$

$$k_0^{\mu} = \left(N_{grid,x}^{start,\mu} + N_{grid,x}^{size,\mu}/2\right) N_{sc}^{RB} - \left(N_{grid,x}^{start,\mu_0} + N_{grid,x}^{size,\mu_0}/2\right) N_{sc}^{RB} 2^{\mu_0-\mu}$$

$$T_{symb,l}^{\mu} = \left(N_u^{\mu} + N_{CP,l}^{\mu}\right) T_c$$

in which t=0 at the start of the subframe, $$N_u^{\mu} = 2048\kappa \cdot 2^{-\mu}$$

$$N_{CP,l}^{\mu} = \begin{cases} 512\kappa \cdot 2^{-\mu} & \text{extended cyclic prefix} \\ 144\kappa \cdot 2^{-\mu} + 16\kappa & \text{normal cyclic prefix}, l = 0 \text{ or } l = 7 \cdot 2^{\mu} \\ 144\kappa \cdot 2^{-\mu} & \text{normal cyclic prefix}, l \ne 0 \text{ and } l \ne 7 \cdot 2^{\mu} \end{cases}$$

and $\Delta f = 2^{\mu} \cdot 15$ [kHz] is given by the 3GPP standard, u is the subcarrier spacing configuration, $\mu_0$ is the largest y value among the subcarrier spacing configurations by scs-SpecificCarrierList, $N_{grid,x}^{size,\mu}$ is the size of the resource grid for subcarrier spacing configuration $\mu$; defined in the 3GPP standard, $N_{grid,x}^{start,\mu}$ is the start of the resource grid as defined in the 3GPP standard, $NP_{sc}^{RB}$ is the number of subcarriers per resource block, and $T_c$ is a basic time unit for NR, $T_c = 1/(480 \times 10^3 \times 4096)$.

The starting position of OFDM symbol l for subcarrier spacing configuration p in a subframe is given in Equation (4) as follows.

$$t_{start,l}^{\mu} = \begin{cases} 0 & l = 0 \\ t_{start,l-1}^{\mu} + \left(N_u^{\mu} + N_{CP,l-1}^{\mu}\right) \cdot T_c & \text{otherwise} \end{cases} \quad (4)$$

In this section, two different embodiments are introduced for waveform construction of the LP-WUS and combining it with NR CP OFDM waveform in baseband.

Multiple Single-Carrier LP-WUS

Figure 9:
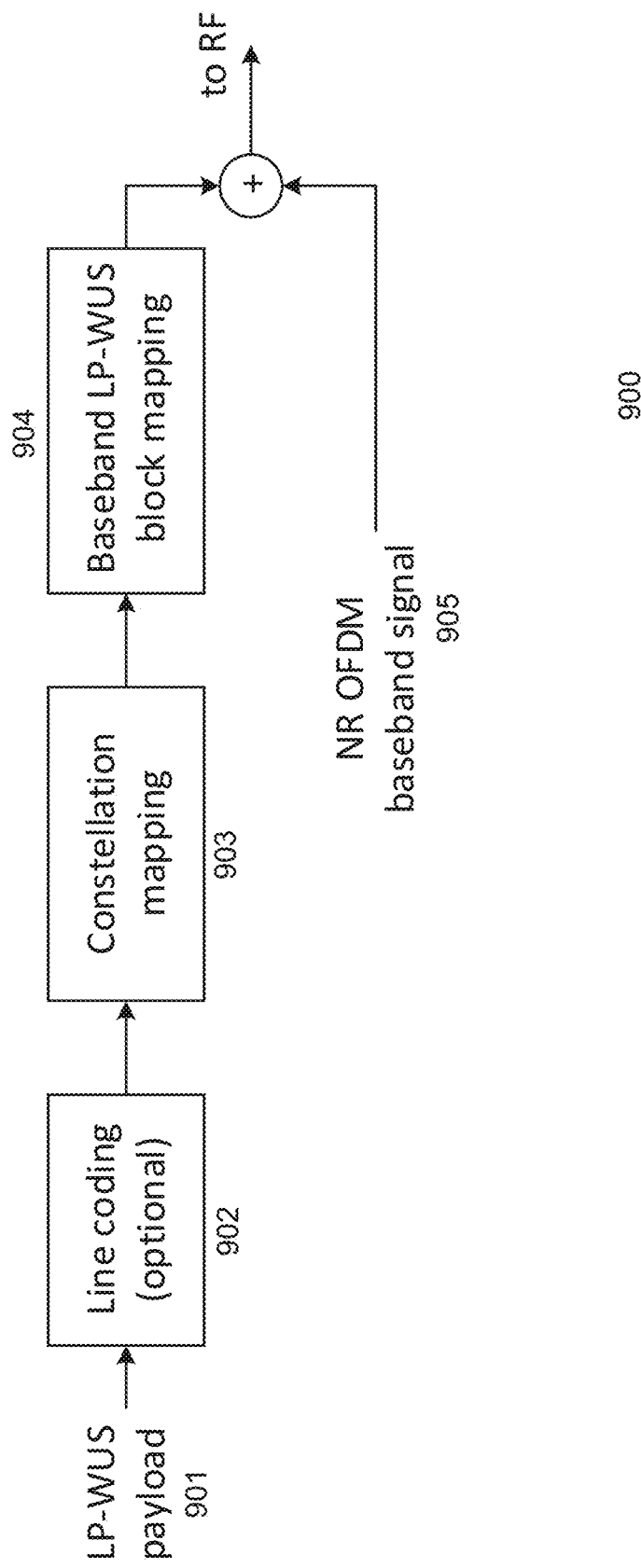
FIG. 9 illustrates a multiple single-carrier LP-WUS 900, according to an embodiment.

FIG. 9 illustrates a multiple single-carrier LP-WUS 900 according to an embodiment. The LP-WUS payload 901 is first encoded using a line coding scheme 902, e.g., Manchester coding. For example, payload bit "1" may be encoded as "1010" or "10," and input bit "0" may be encoded as "0101" or "01" using the Manchester coding scheme. Line coding 902 may be optional and may be used to improve the detection performance of the LP-WUS receiver and avoid false detection of the LP-WUS, as needed.

The output of the line coding 902 may then be mapped, by constellation mapping 903, into baseband symbols using an OOK modulation scheme. When the optional line coding 902 is unused, the LP-WUS payload information bits are directly mapped into baseband symbols 904. In OOK modulation, input bit "1" may be mapped to "On" symbol constellation and bit "0" may be mapped to "Off" constellation symbol, or vice versa. An NR OFDM baseband signal 905 is added to the output of the baseband LP-WUS block mapping 904 to produce an output that is fed to the RF unit.

FIG. 9 illustrates a multiple single-carrier LP-WUS according to an embodiment. Specifically, the OOK constellation mapper takes input bits, "0" or "1", and produces complex-valued constellation symbols as output, as follows: To produce complex-valued output, bit b(i) is mapped to complex-valued constellation symbol d(i) according to Equation (5) as follows, $$d(i)=[b(i)+jb(i)], \quad (5)$$

or according to Equation (6) as follows, $$d(i)=[(1-b(i))+j(1-b(i))], \quad (6)$$

to generate OOK-modulated symbols.

Alternatively, the OOK constellation mapper receives input bits, "0" or "1", and produces real-valued constellation symbols as output in the following manner. To produce real-valued output, bit b(i) is mapped to real-valued constellation symbol d(i) according to Equation (7) as follows, $$d(i)=\sqrt{2}b(i), \quad (7)$$

or according to Equation (8) as follows, $$d(i)=\sqrt{2}[1-b(i)], \quad (8)$$

to generate OOK-modulated symbols.

The OOK-modulated symbols may then be mapped to baseband LP-WUS block(s). A block of OOK-modulated symbols, $d_{m,n}$, $m \in \{0, \ldots, M_{WUS}-1\}$, $n \in \{0, \ldots, N_{WUS}-1\}$, may be organized in a grid of time-frequency resources. The baseband time domain representation of a LP-WUS Block is shown below in Equation

... (9), $$s_{wus}(t) = \sum_{m=0}^{M_{WUS}-1} \sum_{n=0}^{N_{WUS}-1} d_{m,n} u(t-nT) e^{j2\pi m \Delta f_{WUS} t} \quad (9)$$

in which u(t) is the pulse shaping filter that may be any conventional pulse shaping filter, such as Sinc-shaped, Raised-cosine, or Gaussian filter, and $\Delta f_{WUS}$ is the frequency space between two adjacent LP-WUS tones.

Figure 10:
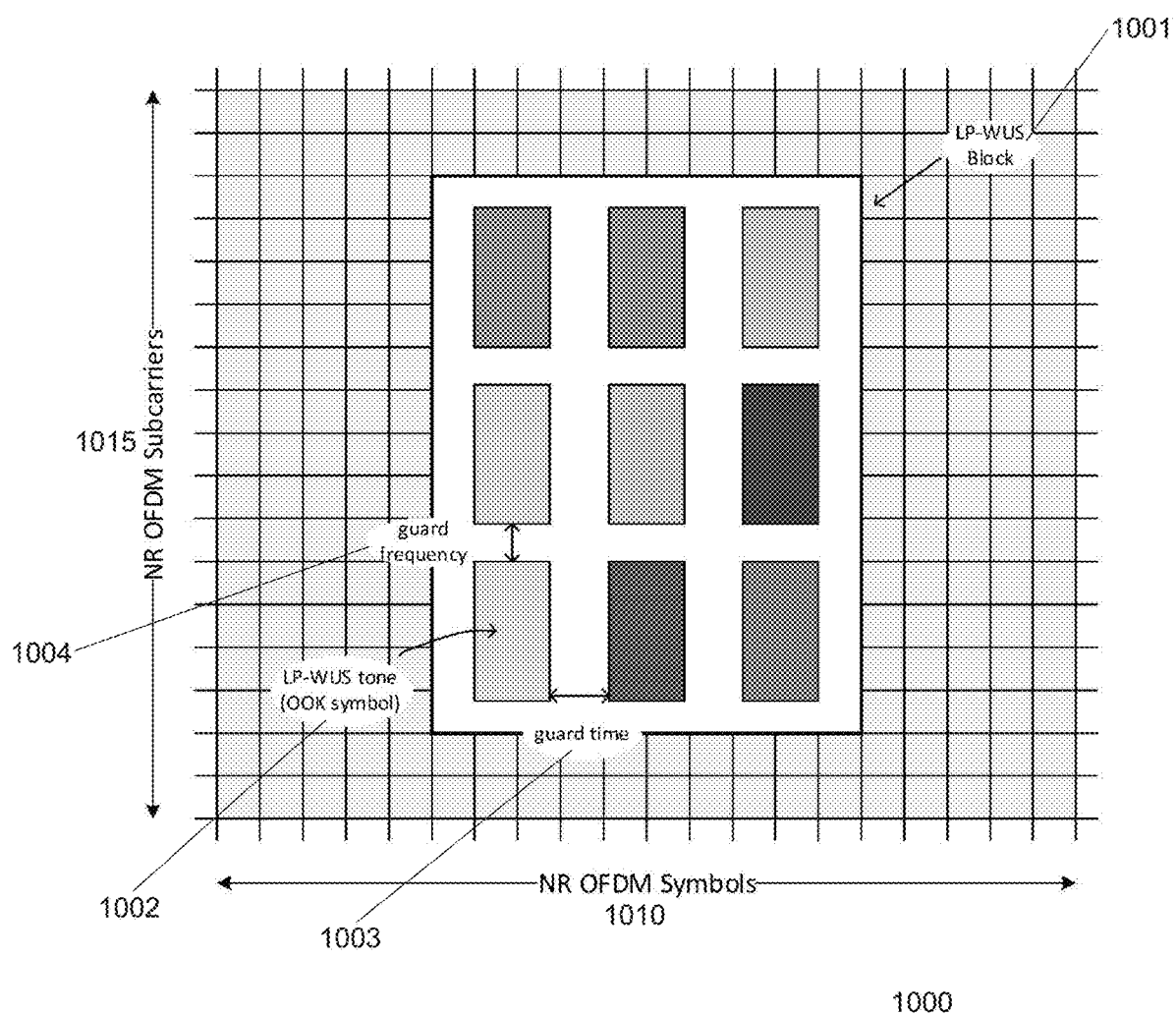
FIG. 10 illustrates a 3×3 LP-WUS block 1000 using single carrier/tone LP-WUS, according to an embodiment.

In FIG. 9, the baseband LP-WUS block 904 is added at the last operation to the NR OFDM baseband signal 905. It is noted that Equation ... (9) assumes that the LP-WUS block starts at time t=0 and frequency f=0. However, as shown in FIG. 10, to accurately place the LP-WUS block in the reserved time-frequency grids of the NR OFDM baseband signal, the baseband LP-WUS Block signal in Equation ... (9) should be properly shifted in time and frequency domains.

FIG. 10 illustrates a 3×3 LP-WUS block 1000 using single carrier/tone LP-WUS, according to an embodiment. FIG. 10, for example, shows a 3×3 LP-WUS block 1001, i.e., 3 LP-WUS tones 1002 (or OOK modulated symbols) are allocated in the time domain 1010 and 3 LP-WUS tones 1002 (or OOK modulated symbols) are allocated in frequency domain 1015. Each LP-WUS tone 1002 in the LP-WUS block 1001 represents an OOK symbol. A guard time 1003 and a guard frequency 1004 may be inserted between the LP-WUS tones 1002, and between the LP-WUS tones and NR OFDM subcarriers, in time 1010 and frequency 1015 domains, respectively. The guard time 1003 and guard frequency 1004 may be used to avoid inter-tone interference between LP-WUS tones 1002 and between LP-WUS tones 1002 and NR OFDM subcarriers. Accounting for the guard frequency may be more critical than accounting for the guard time since the inter-tone interference can be easily reduced by a pulse shaping filter as explained above. However, high Q factor bandpass filters are needed to reduce the inter-tone interference between adjacent LP-WUS signals/tone in frequency. Such high Q factor bandpass filters tend to be expensive and complicated from the design perspective. By having adequate guard frequency between adjacent LP-WUS signals/tones, bandpass filters with a lower Q factor will be sufficient to remove inter-tone interference from the adjacent LP-WUS signals/tones.

Figure 11:
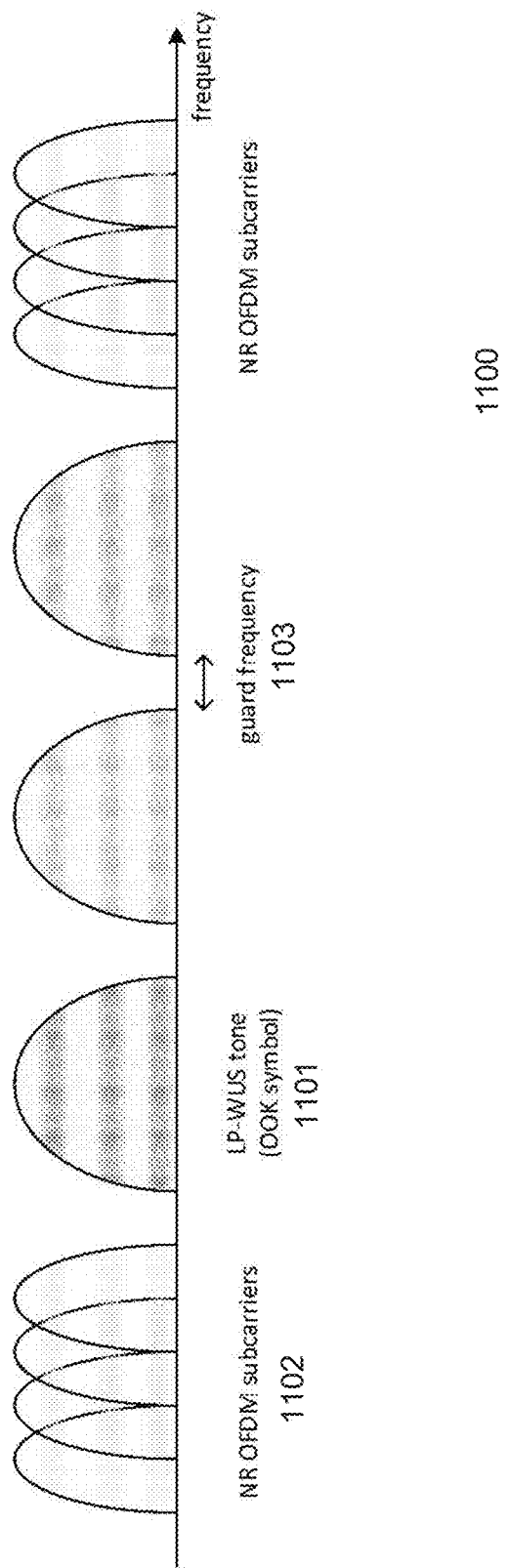
FIG. 11 illustrates an arrangement 1100 of the LP-WUS tones and NR OFDM subcarriers in the frequency domain, according to an embodiment.

FIG. 11 illustrates an arrangement 1100 of the LP-WUS tones 1101 and NR OFDM subcarriers 1102 in the frequency domain, according to an embodiment. In FIG. 11, the bandwidth and the frequency space 1103 between the LP-WUS tones may be chosen independently from the NR OFDM waveform subcarrier 1102 spacing. The duration of the LP-WUS tone 1101 in time may also be chosen independently from the time duration of the NR OFDM symbol. The guard frequency 1103 and the guard time of the LP-WUS block (if used) should be chosen according to the LP-WUS receiver requirements.

Multicarrier LP-WUS

Figure 12:
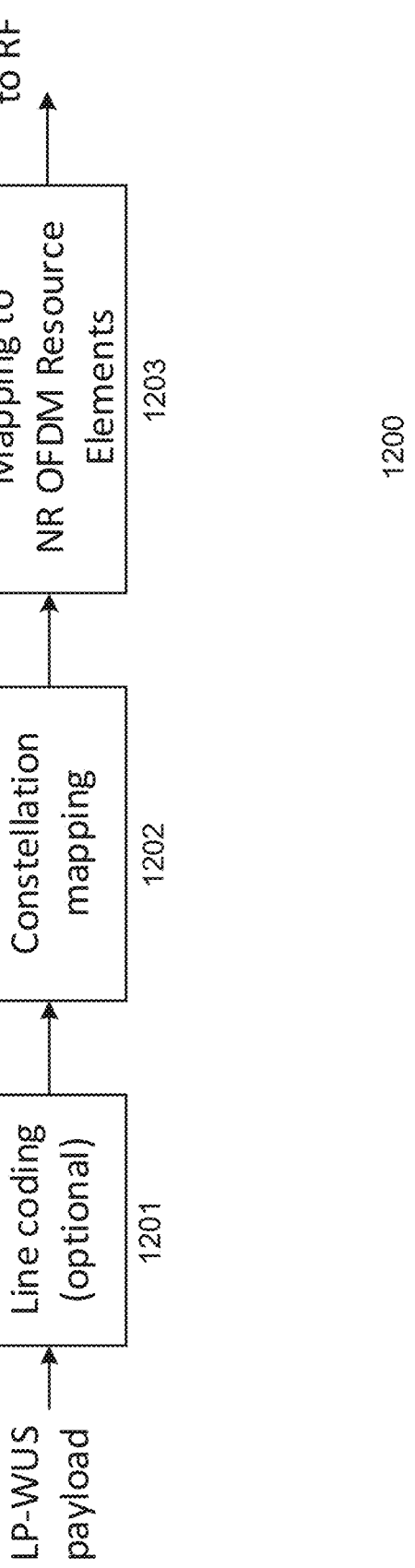
FIG. 12 is a block diagram 1200 illustrating the multi-carrier LP-WUS, according to an embodiment.

FIG. 12 is a block diagram 1200 illustrating the multicarrier LP-WUS, according to an embodiment. In FIG. 12, the NR OFDM resource elements (that have been emptied and reserved for LP-WUS transmission) are used to construct the LP-WUS tones and other components of the LP-WUS block. The optional line coding 1201 and the constellation mapping 1202 blocks performed as explained above in reference to FIG. 9. In contrast, however, the output of the constellation mapping 1202 in FIG. 12, which may be OOK symbols, is directly mapped to the NR OFDM resource elements 1203 that are otherwise empty and reserved for LP-WUS blocks.

Figure 13:
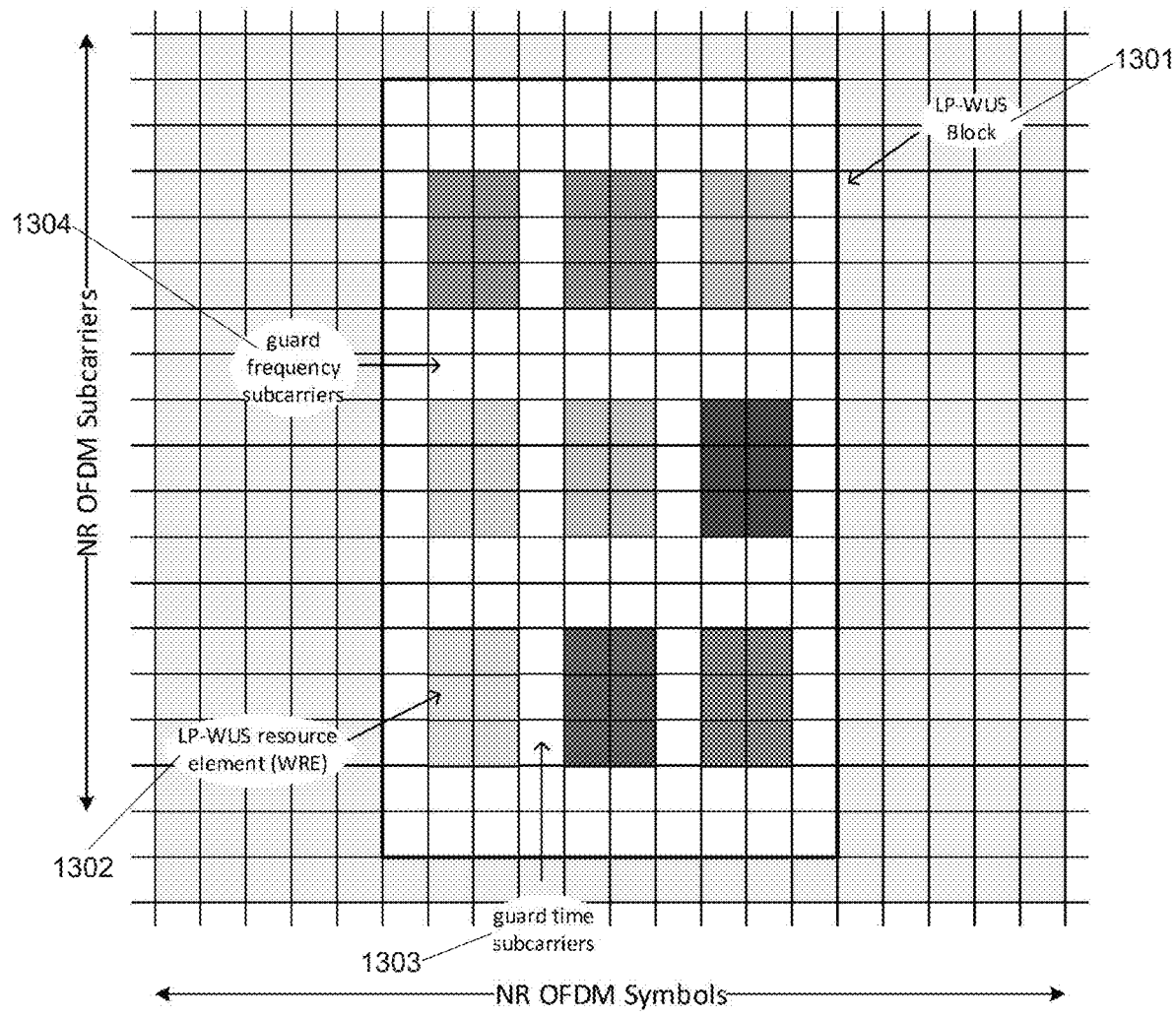
FIG. 13 illustrates a 3×3 LP-WUS block 1300 using multicarrier LP-WUS, according to an embodiment.

FIG. 13 illustrates a 3×3 LP-WUS block 1300 using a multicarrier LP-WUS block 1301, according to an embodiment. Specifically, FIG. 13 illustrates the output of the constellation mapping block to which the OOK symbols are mapped, to NR CP OFDM resource elements. In FIG. 13, it is assumed that a block of 2×3 CP OFDM resource elements 1302 (a total of 6 resource elements) are assigned to one OOK symbol. This indicates that all CP OFDM resource elements within the 2×3 block carry the same OOK symbol d(i). A block of CP OFDM resource elements that carry the same LP-WUS OOK symbol may be referred to as a LP-WUS resource element (WRE). It is noted that the values of resource element (k, l), i.e. $a_{k,l}^{(p,\mu)}$ in Equation for those 2×3 resource elements in the WRE are set to the same OOK symbol d(i).

Similar to the previously described embodiments, a guard time 1303 and a guard frequency 1304 may be inserted between the LP-WUS REs 1302, and between the LP-WUS REs 1302 and NR OFDM subcarriers in time 1305 and frequency 1310 domains, respectively. In this embodiment, however, the guard time 1303 and the guard frequency 1304 may be CP OFDM REs. As shown in FIG. 13, for example, two resource elements (or subcarriers) are assigned for guard frequency 1304 and one resource element (or OFDM symbol) is assigned for the guard time 1303. The guard time 1303 and guard frequency 1304 in FIG. 13 may follow the numerology of the NR OFDM waveform and are integer multiples of the subcarrier spacing and OFDM symbol duration, respectively.

Figure 14:
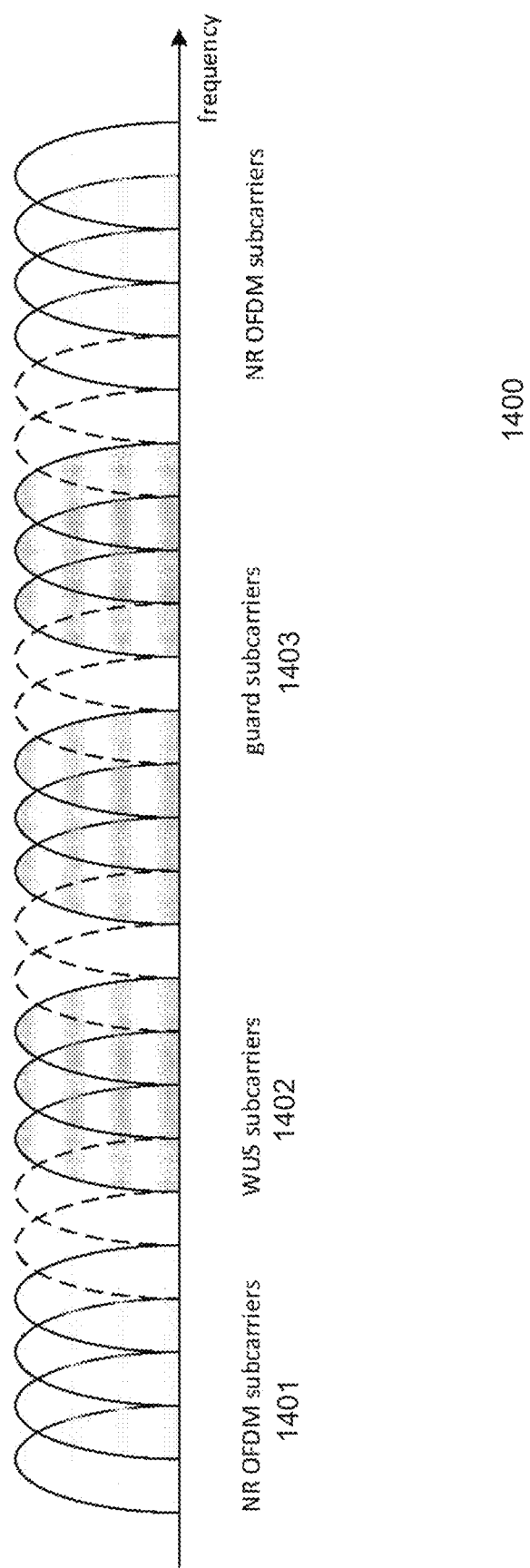
FIG. 14 illustrates an arrangement 1400 of the LP-WUS tones and NR OFDM subcarriers in the frequency domain, according to an embodiment.

FIG. 14 illustrates an arrangement 1400 of the LP-WUS tones and NR OFDM subcarriers in the frequency domain, according to an embodiment. As seen in FIG. 14, three OFDM resource elements (subcarriers) 1401 including WUS subcarriers 1402 and guard subcarriers 1403 are assigned to one LP-WUS OOK modulated symbol.

LP-WUS Resource Mapping

LP-WUS sequence may be an L-bit binary sequence that is assigned to a UE as the LP-WUS signature for the UE. More than one LP-WUS signature may be assigned to a UE. A LP-WUS block may contain one or more LP-WUS signatures. For example, K LP-WUS sequence signatures having length L may combine to form the LP-WUS payload. The LP-WUS payload bits (or symbols) $d_{k,l}$, (k∈{0, . . . , K−1}, l∈{0, . . . , L−1}) may be mapped to LP-WUS block resource elements (WRE) using the following mapping schemes.

Type 1 Mapping—Time Domain First

Figure 15:
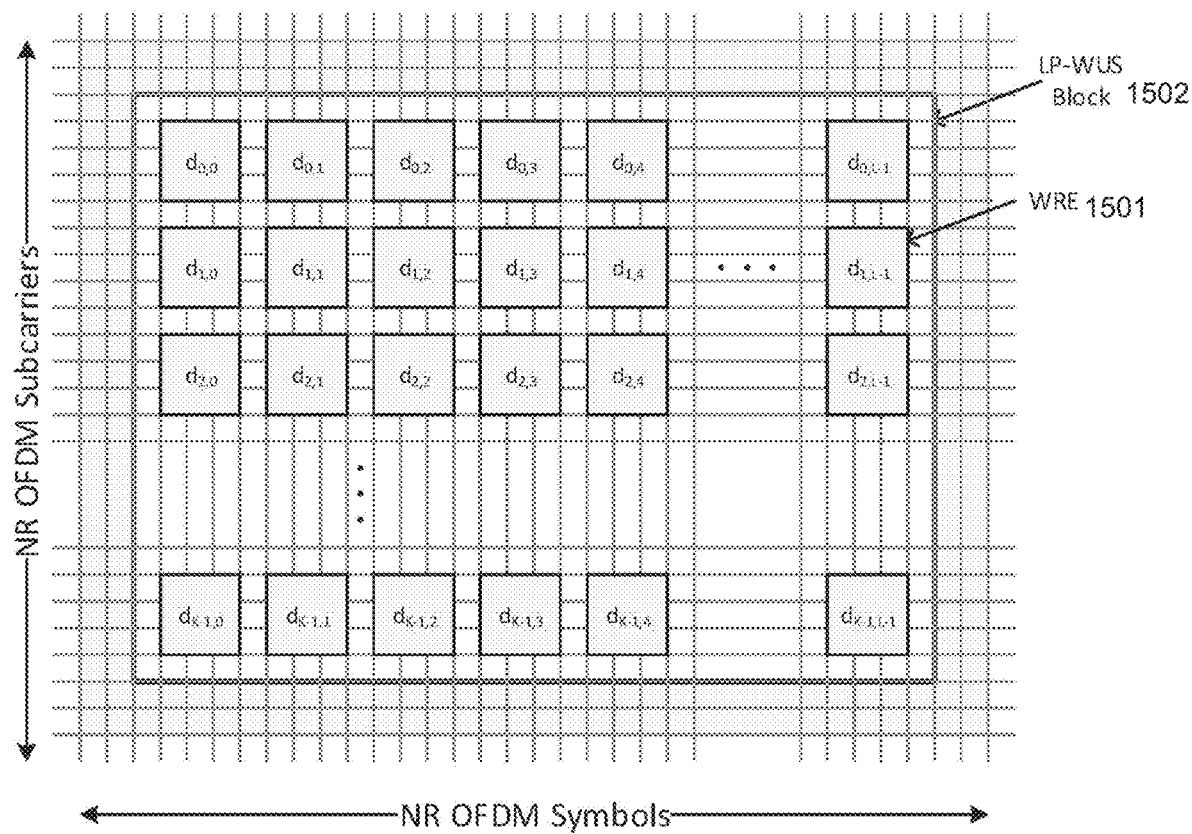
FIG. 15 illustrates a Type 1 mapping 1500 for LP-WUS resource, according to an embodiment.

FIG. 15 illustrates a Type 1 mapping 1500 for LP-WUS resources, according to an embodiment. In FIG. 15, the LP-WUS payload bits (or symbols) $d_{k,l}$ (k∈{0, . . . , K−1}, l∈{0, . . . , L−1}) are mapped to WREs 1501 first in the time domain and then in the frequency domain. It is assumed in FIG. 15 that the width of the LP-WUS block 1502 in time is L, and the length of the LP-WUS block 1502 in frequency is K. However, the width and length of the LP-WUS block 1502 may be arbitrarily selected regardless of the sequence length L or the number K of the LP-WUS sequences, so long as K sequences with length L fit in the LP-WUS block 1502.

Type 2 Mapping—Frequency Domain First

Figure 16:
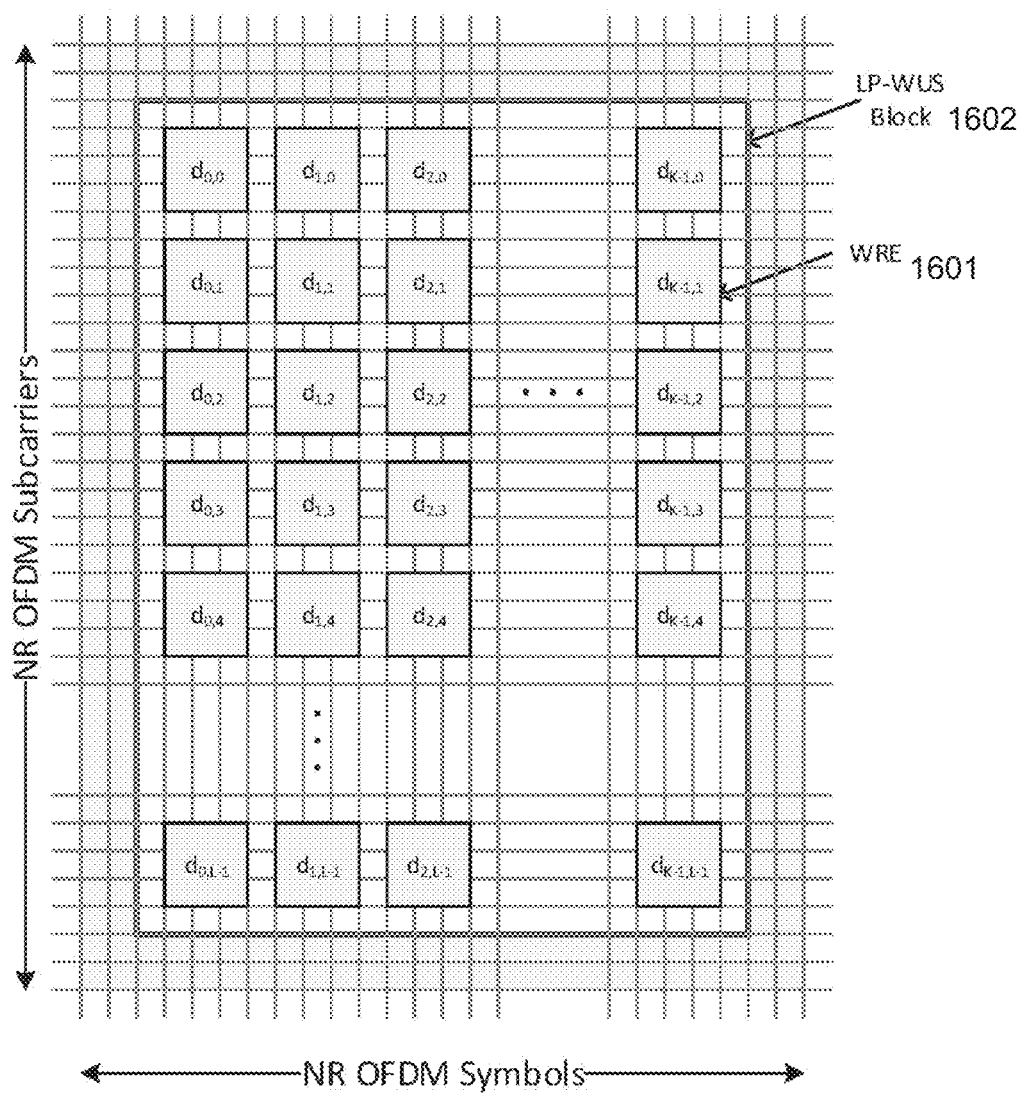
FIG. 16 illustrates a Type 2 mapping 1600 for LP-WUS resources, according to an embodiment.

FIG. 16 illustrates a Type 2 mapping 1600 for LP-WUS resources, according to an embodiment. In FIG. 16, the LP-WUS payload bits (symbols) $d_{k,l}$ (k∈{0, . . . , K−1}, l∈{0, . . . , L−1}) are mapped to WREs 1601 first in the frequency domain and then in the time domain. In FIG. 16, it is assumed that the width of the LP-WUS block 1602 in time is K, and the length of the LP-WUS block 1602 in frequency is L. However, the width and length of the LP-WUS block 1602 may be arbitrarily selected regardless of the sequence length L or the number K of the LP-WUS sequences, so long as K sequences with length L fit in the LP-WUS block 1602.

LP-WUS Signature Configuration

A UE may be configured with one or multiple LP-WUS sequence signatures. In either case, the LP-WUS signature(s) are dedicated to one UE. In other words, the at least one LP-WUS signature is UE-specific, and the signatures are used by the network to wake up only one UE. Herein, a UE may be configured explicitly by the network in a static or semi-static or dynamic fashion, through RRC, MAC CE, or DCI configuration. Alternatively, the UE may be configured implicitly with one or more signatures that may be one or more RNTI values allocated to the UE or may be derived from the RNTIs.

A group of UEs may be configured only with one LP-WUS sequence signature, or with multiple common LP-WUS sequence signatures. In either case, the LP-WUS signature(s) are assigned to a group of UEs and are used by the network to wake up the group of UEs together. The UEs within the group may be configured explicitly by the network in a static, or semi-static or dynamic fashion, through RRC configuration or MAC CE configuration or DCI configuration.

At least one LP-WUS sequence signature may also be broadcast in a SIB such that all or some UEs belonging the same cell are configured with the same LP-WUS sequence(s).

Line Coding Indication

The LP-WUS signatures may be line coded, for example using Manchester coding scheme. An indication to notify whether the signature is line coded is sent to UE. The indication may be sent to the UE when it is configured with LP-WUS signature(s) as previously explained. The indication may be broadcast to all UEs in the cell within master information block or a system information block.

Figure 17:
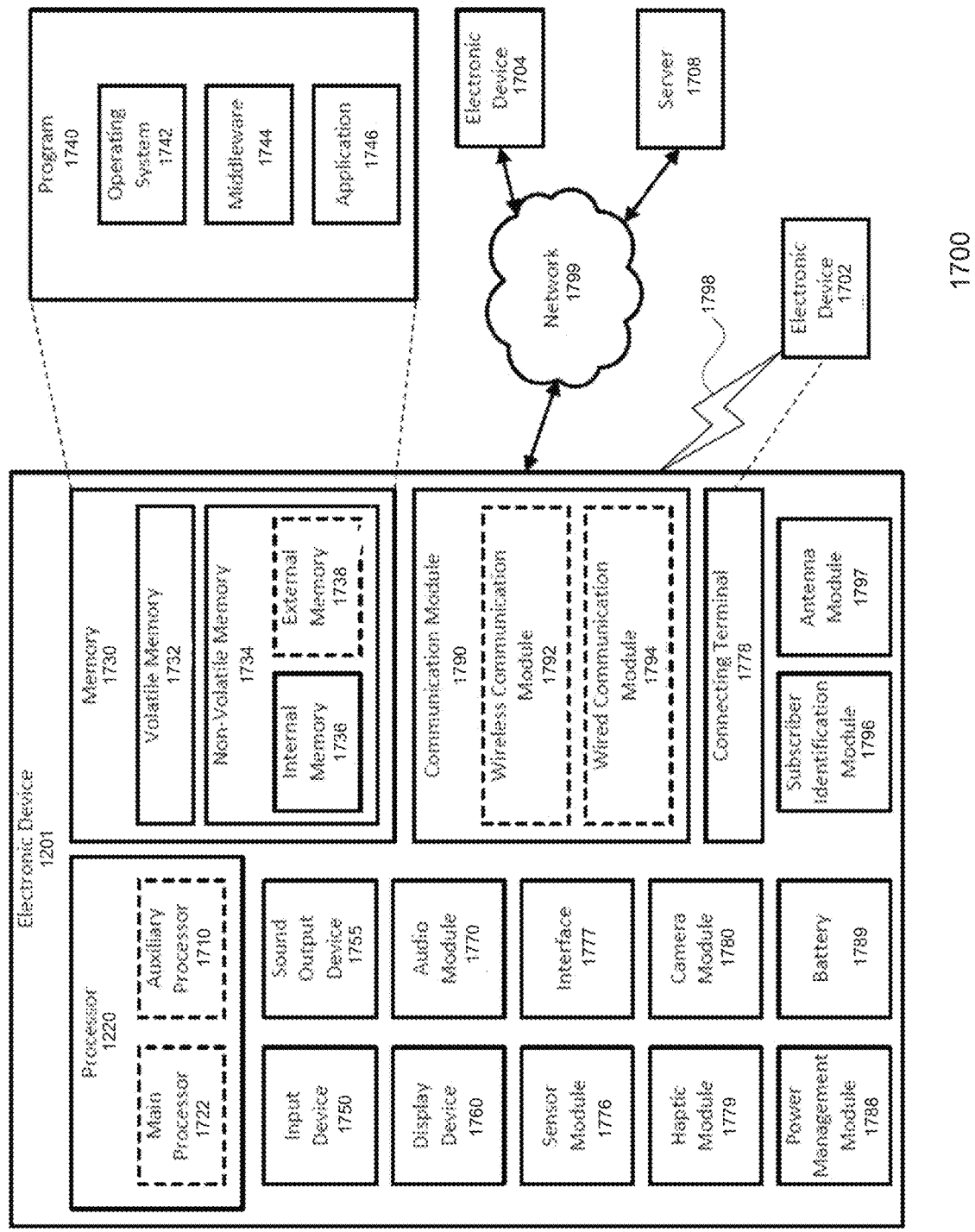
FIG. 17 is a block diagram 1700 of an electronic device in a network environment, according to an embodiment.

FIG. 17 is a block diagram of an electronic device in a network environment 1700, according to an embodiment.

Referring to FIG. 17, an electronic device 1701 in a network environment 1700 may communicate with an electronic device 1702 via a first network 1798 (e.g., a short-range wireless communication network), or an electronic device 1704 or a server 1708 via a second network 1799 (e.g., a long-range wireless communication network). The electronic device 1701 may communicate with the electronic device 1704 via the server 1708. The electronic device 1701 may include a processor 1720, a memory 1730, an input device 1740, a sound output device 1755, a display device 1760, an audio module 1770, a sensor module 1776, an interface 1777, a haptic module 1779, a camera module 1780, a power management module 1788, a battery 1789, a communication module 1790, a subscriber identification module (SIM) card 1796, or an antenna module 1794. In one embodiment, at least one (e.g., the display device 1760 or the camera module 1780) of the components may be omitted from the electronic device 1701, or one or more other components may be added to the electronic device 1701. Some of the components may be implemented as a single integrated circuit (IC). For example, the sensor module 1776 (e.g., a fingerprint sensor, an iris sensor, or an illuminance sensor) may be embedded in the display device 1760 (e.g., a display).

The processor 1720 may execute, for example, software (e.g., a program 1740) to control at least one other component (e.g., a hardware or a software component) of the electronic device 1701 coupled with the processor 1720 and may perform various data processing or computations. As at least part of the data processing or computations, the processor 1720 may load a command or data received from another component (e.g., the sensor module 1746 or the communication module 1790) in volatile memory 1732, process the command or the data stored in the volatile memory 1732, and store resulting data in non-volatile memory 1734. The processor 1720 may include a main processor 1721 (e.g., a central processing unit (CPU) or an application processor (AP)), and an auxiliary processor 1723 (e.g., a graphics processing unit (GPU), an image signal processor (ISP), a sensor hub processor, or a communication processor (CP)) that is operable independently from, or in conjunction with, the main processor 1721. Additionally or alternatively, the auxiliary processor 1723 may be adapted to consume less power than the main processor 1721, or execute a particular function. The auxiliary processor 1723 may be implemented as being separate from, or a part of, the main processor 1721.

The auxiliary processor 1723 may control at least some of the functions or states related to at least one component (e.g., the display device 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). The auxiliary processor 1723 (e.g., an image signal processor or a communication processor) may be implemented as part of another component (e.g., the camera module 1780 or the communication module 1790) functionally related to the auxiliary processor 1723.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input device 1750 may receive a command or data to be used by another component (e.g., the processor 1720) of the electronic device 1701, from the outside (e.g., a user) of the electronic device 1701. The input device 1750 may include, for example, a microphone, a mouse, or a keyboard.

The sound output device 1755 may output sound signals to the outside of the electronic device 1701. The sound output device 1755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1760 may visually provide information to the outside (e.g., a user) of the electronic device 1701. The display device 1760 may include, for example, a display, a hologram device, or a projector and control circuitry to control a corresponding one of the display, hologram device, and projector. The display device 1760 may include touch circuitry adapted to detect a touch, or sensor circuitry (e.g., a pressure sensor) adapted to measure the intensity of force incurred by the touch.

The audio module 1770 may convert a sound into an electrical signal and vice versa. The audio module 1770 may obtain the sound via the input device 1750 or output the sound via the sound output device 1755 or a headphone of an external electronic device 1702 directly (e.g., wired) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. The sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device 1702 directly (e.g., wired) or wirelessly. The interface 1777 may include, for example, a high-definition multimedia interface (HDMI), a universal serial bus (USB) interface, a secure digital (SD) card interface, or an audio interface.

A connecting terminal 1778 may include a connector via which the electronic device 1701 may be physically connected with the external electronic device 1702. The connecting terminal 1778 may include, for example, an HDMI connector, a USB connector, an SD card connector, or an audio connector (e.g., a headphone connector).

The haptic module 1779 may convert an electrical signal into a mechanical stimulus (e.g., a vibration or a movement) or an electrical stimulus which may be recognized by a user via tactile sensation or kinesthetic sensation. The haptic module 1779 may include, for example, a motor, a piezoelectric element, or an electrical stimulator.

The camera module 1780 may capture a still image or moving images. The camera module 1780 may include one or more lenses, image sensors, image signal processors, or flashes.

The power management module 1788 may manage power supplied to the electronic device 1701. The power management module 1788 may be implemented as at least part of, for example, a power management integrated circuit (PMIC).

The battery 1789 may supply power to at least one component of the electronic device 1701. The battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the AP) and supports a direct (e.g., wired) communication or a wireless communication. The communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, wireless-fidelity (Wi-Fi) direct, or a standard of the Infrared Data Association (IrDA)) or the second network 1799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The antenna module 1797 may transmit or receive a signal or power to or from the outside (e.g., the external electronic device) of the electronic device 1701. The antenna module 1797 may include one or more antennas, and, therefrom, at least one antenna appropriate for a communication scheme used in the communication network, such as the first network 1798 or the second network 1799, may be selected, for example, by the communication module 1790 (e.g., the wireless communication module 1792). The signal or the power may then be transmitted or received between the communication module 1790 and the external electronic device via the selected at least one antenna.

Commands or data may be transmitted or received between the electronic device 1701 and the external electronic device 1704 via the server 1708 coupled with the second network 1799. Each of the electronic devices 1702 and 1704 may be a device of a same type as, or a different type, from the electronic device 1701. All or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1701. The electronic device 1701 may provide the outcome, with or without further processing of the outcome, as at least part of a reply to the request. To that end, a cloud computing, distributed computing, or client-server computing technology may be used, for example.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singularly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus.

Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above but is instead defined by the following claims.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. A method of a gNB, comprising:
encoding a low power wake up signal (LP-WUS) payload using a line coding scheme;
mapping a line coding output of the line coding scheme to baseband symbols using a keying modulation;
mapping symbols of the keying modulation to baseband LP-WUS blocks; and
transmitting the baseband LP-WUS blocks to a low power wake up receiver (LP-WUR) of a user equipment (UE).

2. The method of claim 1,
wherein the keying modulation is one of on-off keying (OOK) or frequency shift keying (FSK) modulation.

3. The method of claim 1,
wherein the mapped symbols are modulated on multiple LP-WUS single carrier tones organized in a time domain and a frequency domain and are placed in empty resource elements (REs) of a new radio orthogonal frequency division multiplexing downlink radio frequency (NR OFDM DL RF) signal.

4. The method of claim 3,
wherein the LP-WUS single-carrier tones are separated from each other and from NR OFDM subcarriers by time and frequency guards.

5. The method of claim 3,
wherein the symbols of the keying modulation are mapped to NR OFDM subcarriers at a baseband and are repeated in adjacent subcarriers in the time and frequency domains.

6. The method of claim 3,
wherein the LP-WUS blocks are separated from each other and from NR OFDM subcarriers by time and frequency guards and OFDM symbols.

7. The method of claim 6,
wherein the LP-WUS sequence is an L-bit binary sequence and the at least one LP-WUS signature is assigned to at least one UE or a group of UEs to wake up the LP-WUR of the UE or LP-WURs of the group of UEs together, where L is a variable representing length in bits.

8. The method of claim 3, further comprising:
beamforming the LP-WUS blocks; and
transmitting the beamformed LP-WUS blocks to a predetermined direction within a cell,
wherein LP-WUS payload symbols are mapped to wake up resource elements first in the time domain and then in the frequency domain or are mapped to the wake up resource elements first in the frequency domain and then in the time domain.

9. The method of claim 1, further comprising:
assigning at least one LP-WUS sequence to the UE as at least one LP-WUS signature for the UE.

10. The method of claim 1, further comprising:
periodically transmitting the LP-WUS blocks to the LP-WUR of the UE or LP-WURs of a group of UEs including the UE,
wherein the UE or the group of UEs are configured to turn on the LP-WUR or the LP-WURs only during reception of the LP-WUS blocks.

11. An apparatus, comprising:
at least one processor; and
at least one memory operatively connected with the at least one processor, the at least one memory storing instructions, which when executed, instruct the at least one processor to perform a method by:
encoding a low power wake up signal (LP-WUS) payload using a line coding scheme;
mapping a line coding output of the line coding scheme to baseband symbols using a keying modulation;
mapping symbols of the keying modulation to baseband LP-WUS blocks; and
transmitting the baseband LP-WUS blocks to a low power wake up receiver (LP-WUR) of a user equipment (UE).

12. The apparatus of claim 11,
wherein the keying modulation is one of on-off keying (OOK) or frequency shift keying (FSK) modulation.

13. The apparatus of claim 11,
wherein the mapped symbols are modulated on multiple LP-WUS single carrier tones organized in a time domain and a frequency domain and are placed in empty resource elements (REs) of a new radio orthogonal frequency division multiplexing downlink radio frequency (NR OFDM DL RF) signal.

14. The apparatus of claim 13,
wherein the LP-WUS single-carrier tones are separated from each other and from NR OFDM subcarriers by time and frequency guards.

15. The apparatus of claim 13,
wherein the symbols of the keying modulation are mapped to NR OFDM subcarriers at a baseband and are repeated in adjacent subcarriers in the time and frequency domains.

16. The apparatus of claim 13,
wherein the LP-WUS blocks are separated from each other and from NR OFDM subcarriers by time and frequency guards and OFDM symbols.

17. The apparatus of claim 16,
wherein the LP-WUS sequence is an L-bit binary sequence and the at least one LP-WUS signature is assigned to at least one UE or a group of UEs to wake up the LP-WUR of the UE or LP-WURs of the group of UEs together, where L is a variable representing length in bits.

18. The apparatus of claim 13,
wherein the processor is further instructed to perform the method by beamforming the LP-WUS blocks and transmitting the beamformed LP-WUS blocks to a predetermined direction within a cell, and
wherein LP-WUS payload symbols are mapped to wake up resource elements first in the time domain and then in the frequency domain or are mapped to the wake up resource elements first in the frequency domain and then in the time domain.

19. The apparatus of claim 11,
wherein the processor is further instructed to perform the method by assigning at least one LP-WUS sequence to the UE as at least one LP-WUS signature for the UE.

20. The apparatus of claim 11,
wherein the processor is further instructed to perform the method by periodically transmitting the LP-WUS blocks to the LP-WUR of the UE or LP-WURs of a group of UEs including the UE, and
wherein the UE or the group of UEs are configured to turn on the LP-WUR or the LP-WURs only during reception of the LP-WUS blocks.

\* \* \* \* \*